Dec. 29, 1936.  W. C. BROOKS ET AL  2,065,645
HEEL CONCAVING MACHINE
Filed Oct. 7, 1929   14 Sheets-Sheet 14
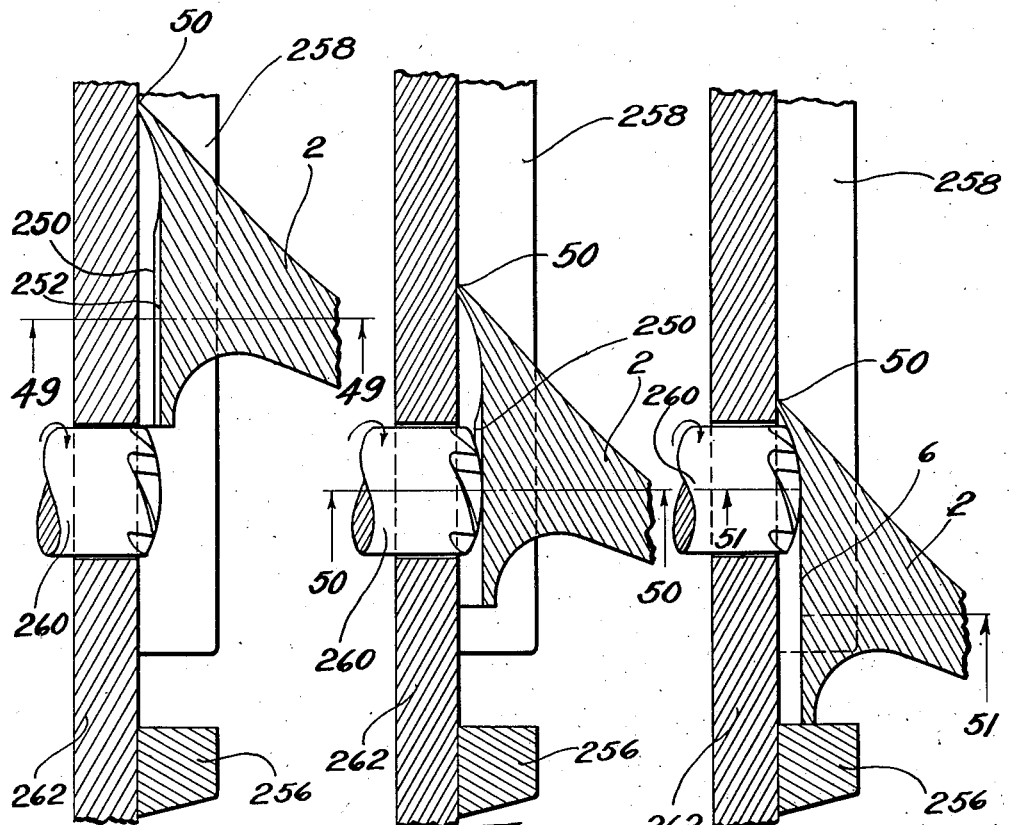
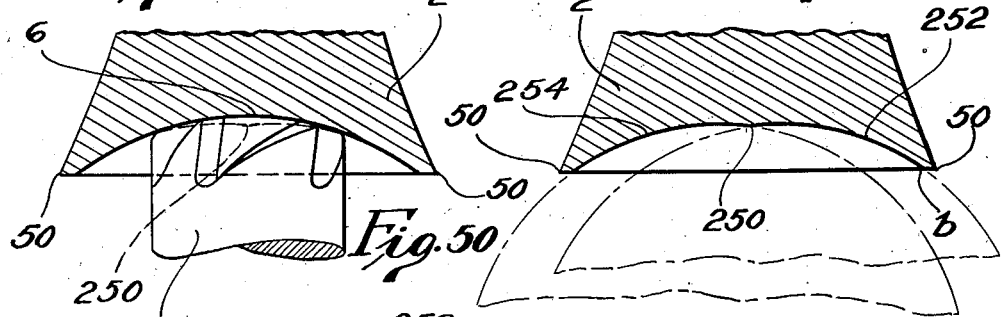
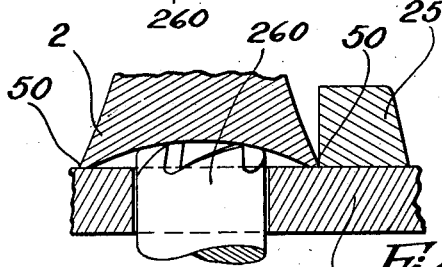
Inventors
John Winfield Staples
Walter Chesley Brooks
By David Rines
Attorney Patented Dec. 29, 1936

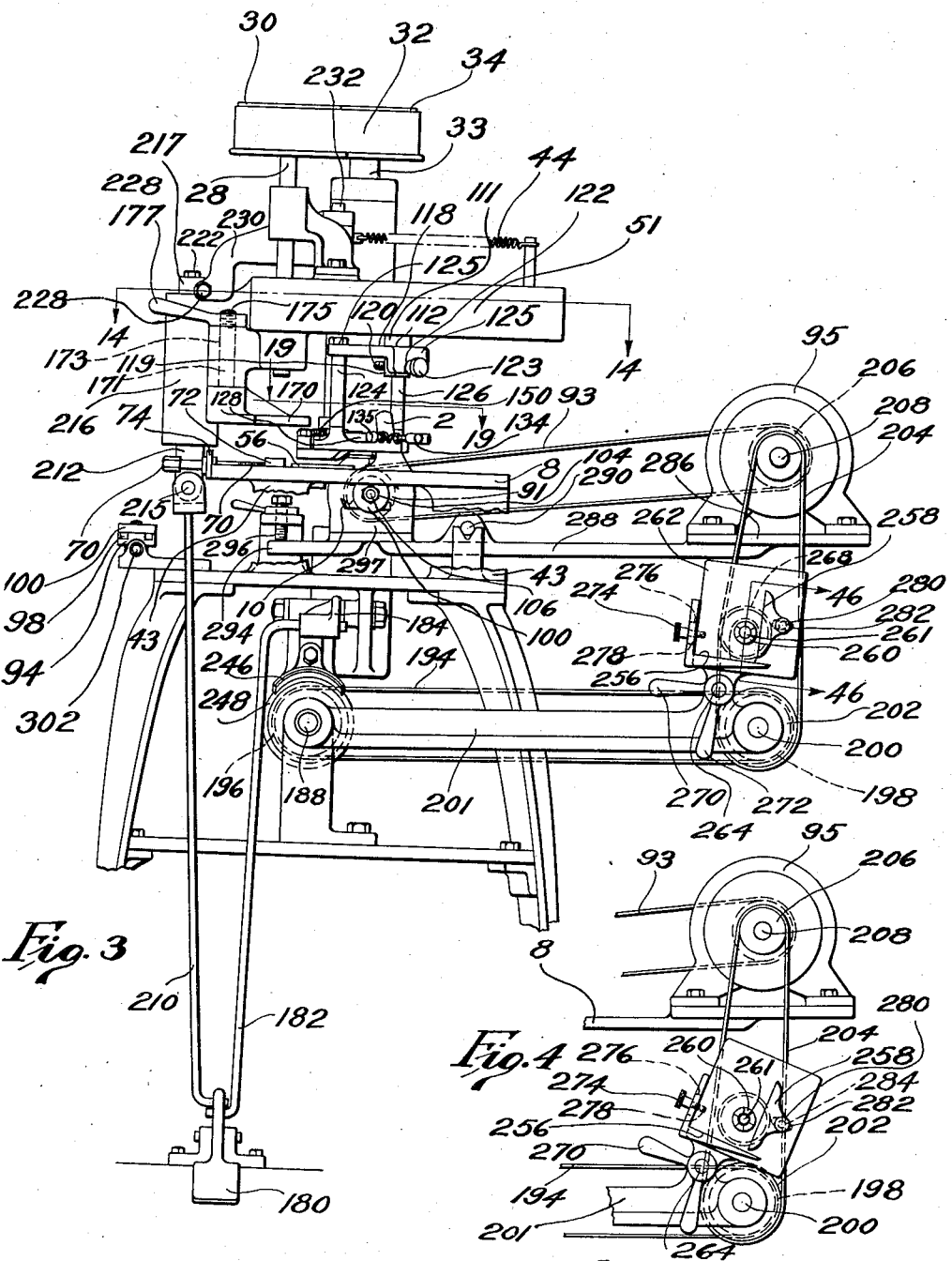

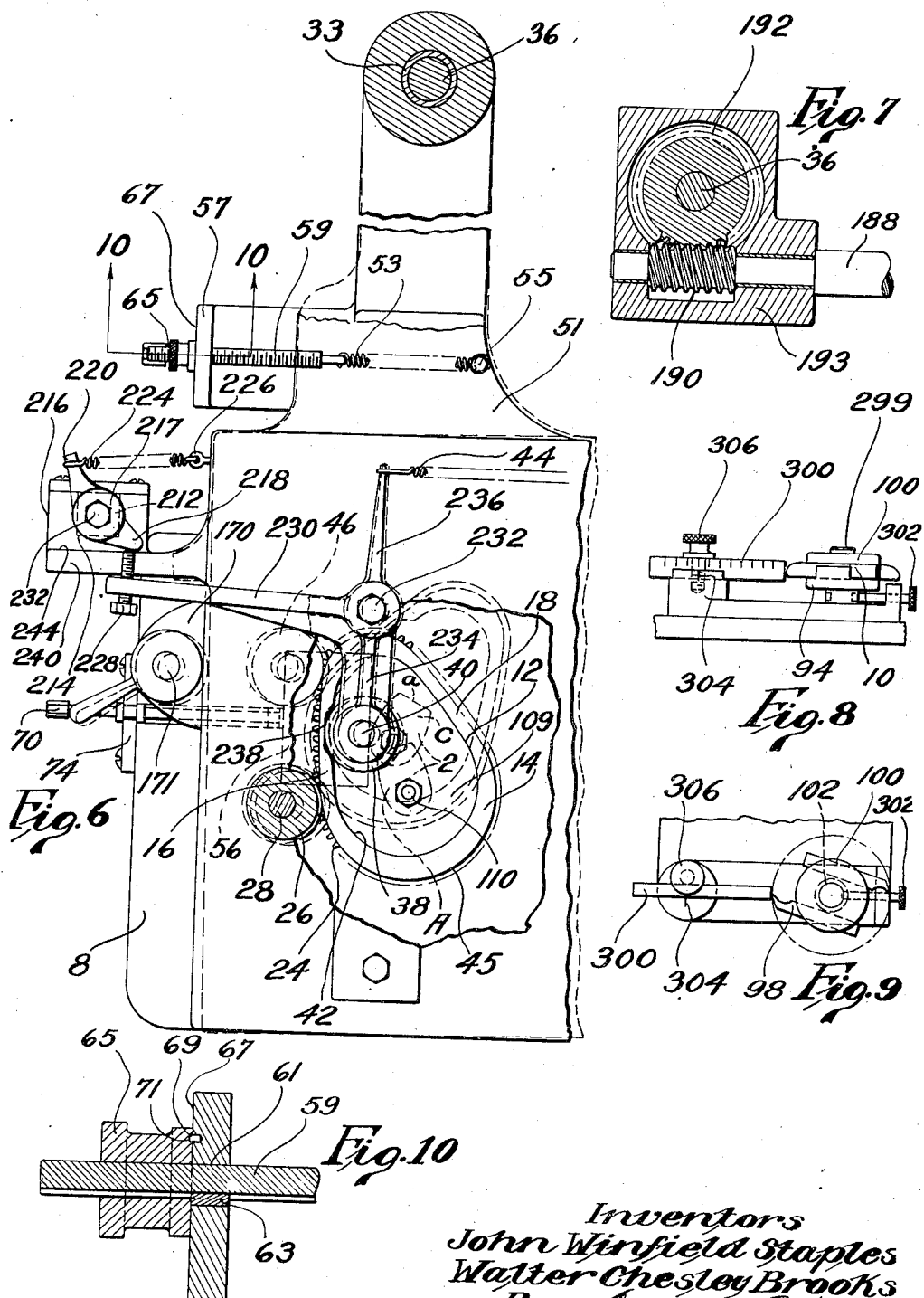

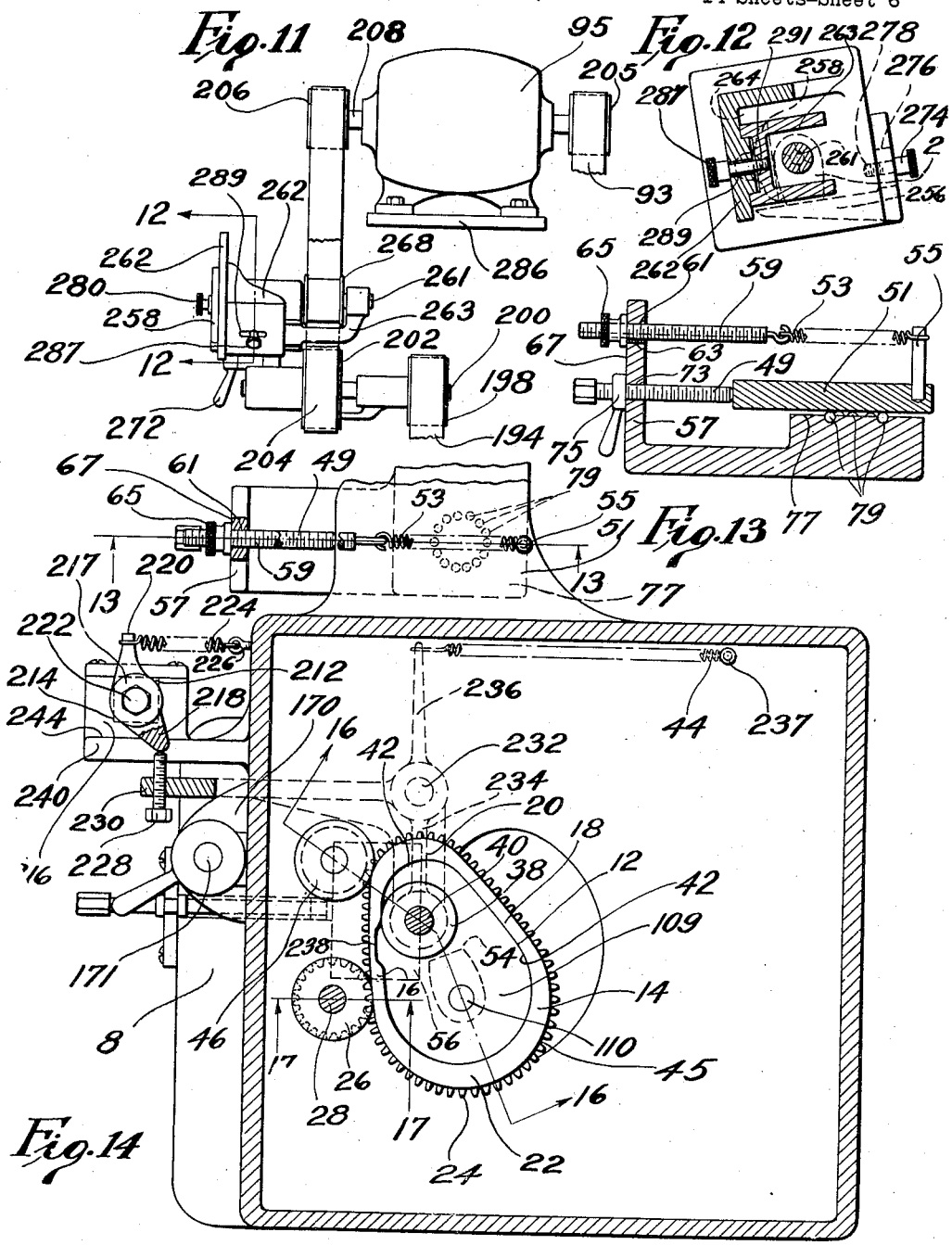

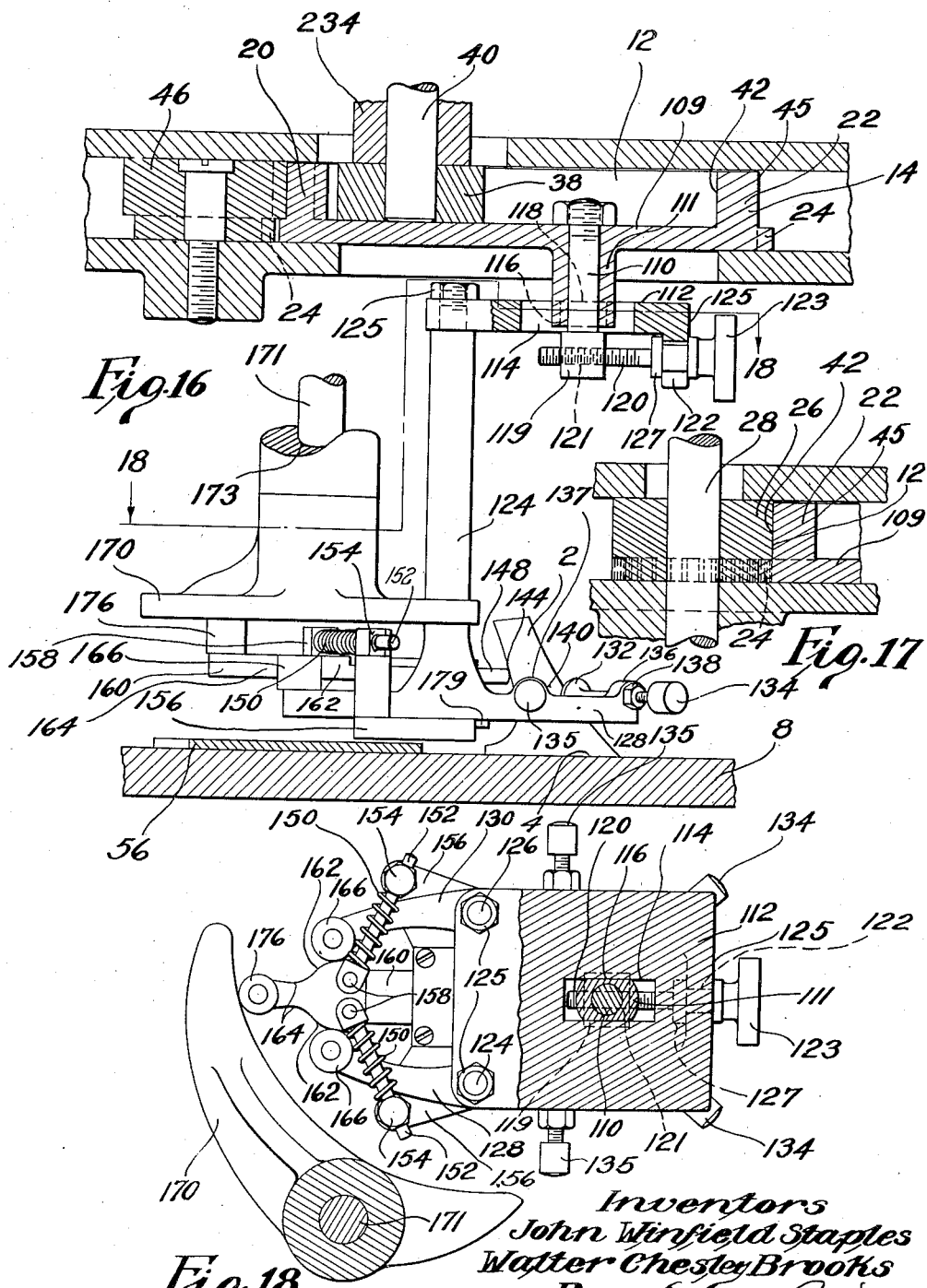

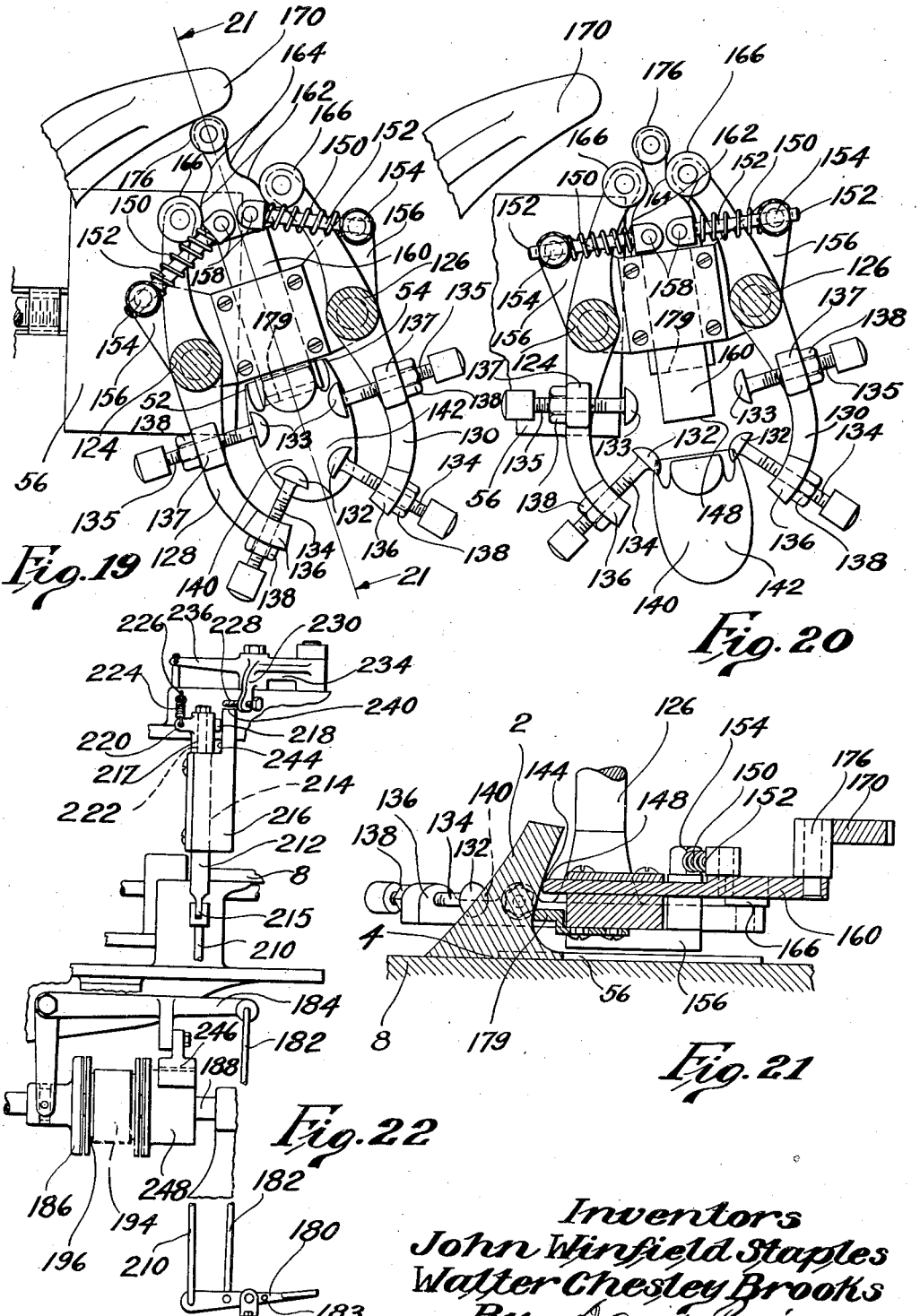

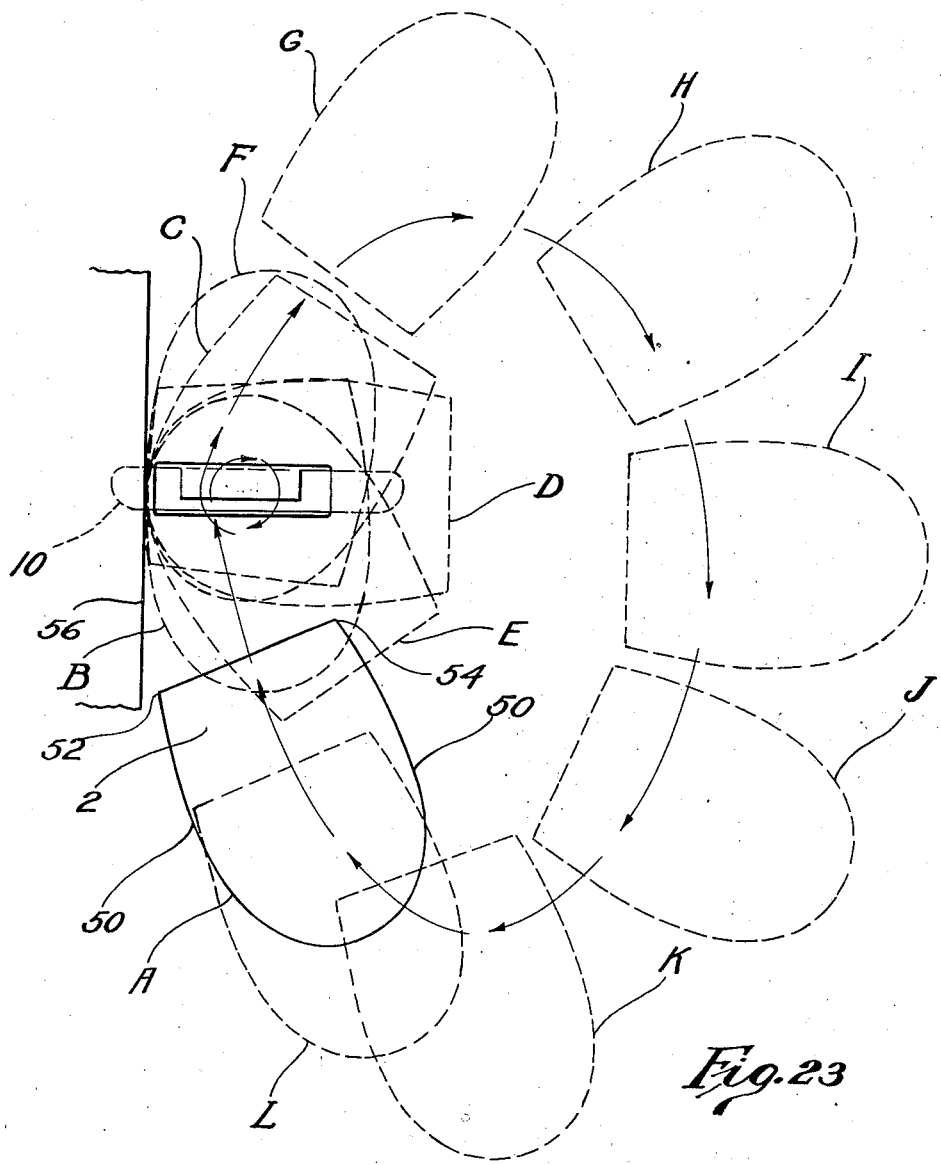

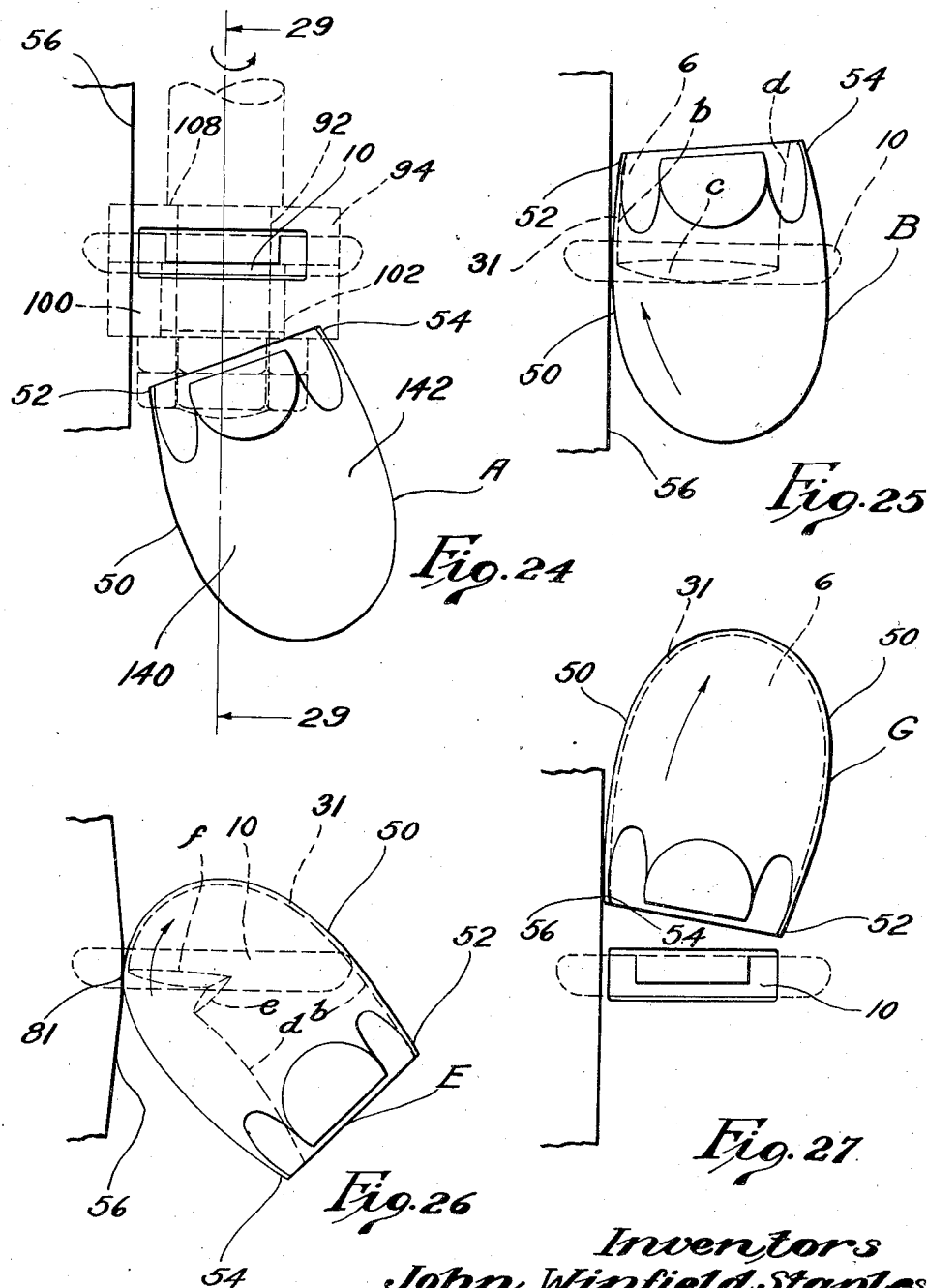

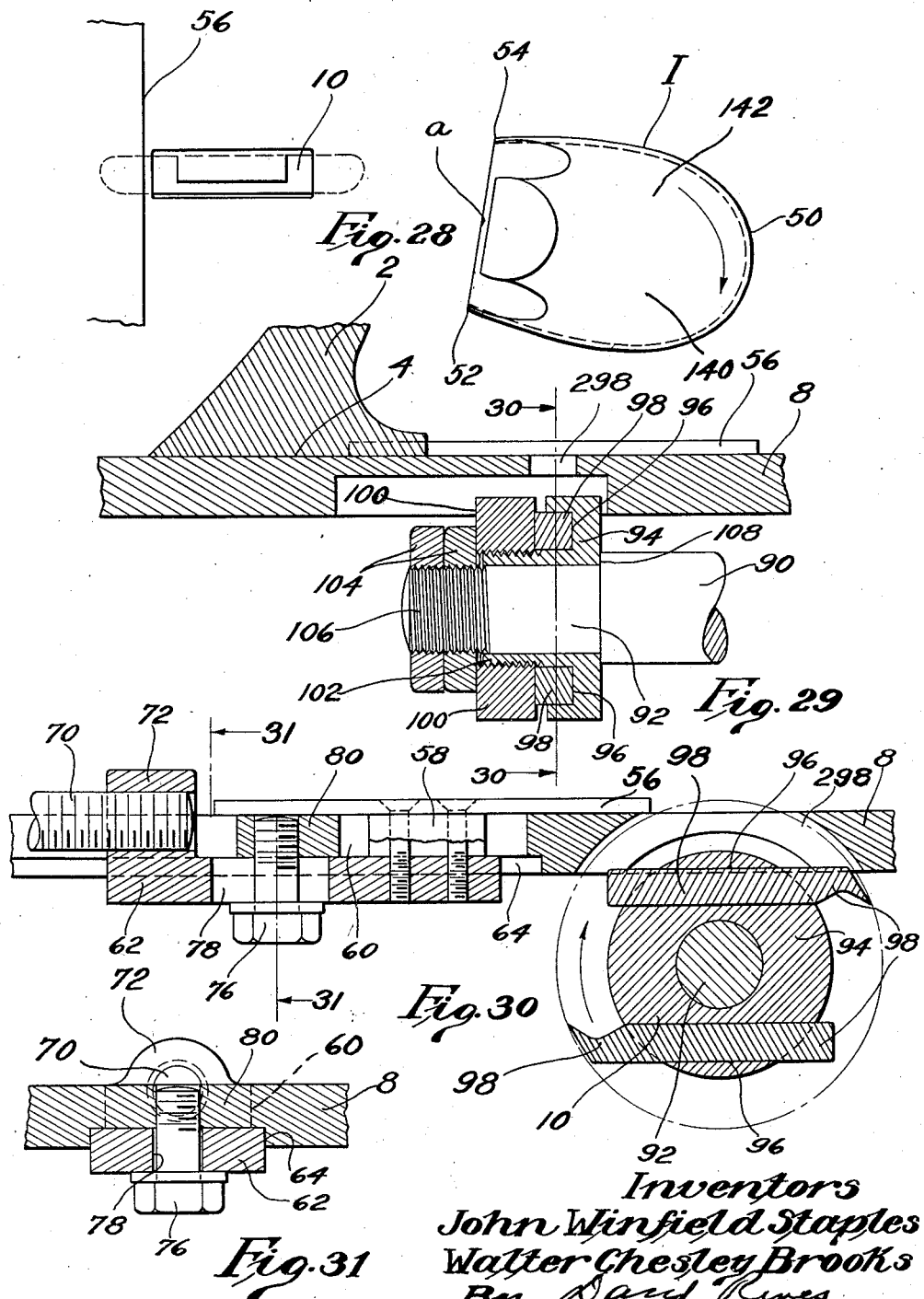

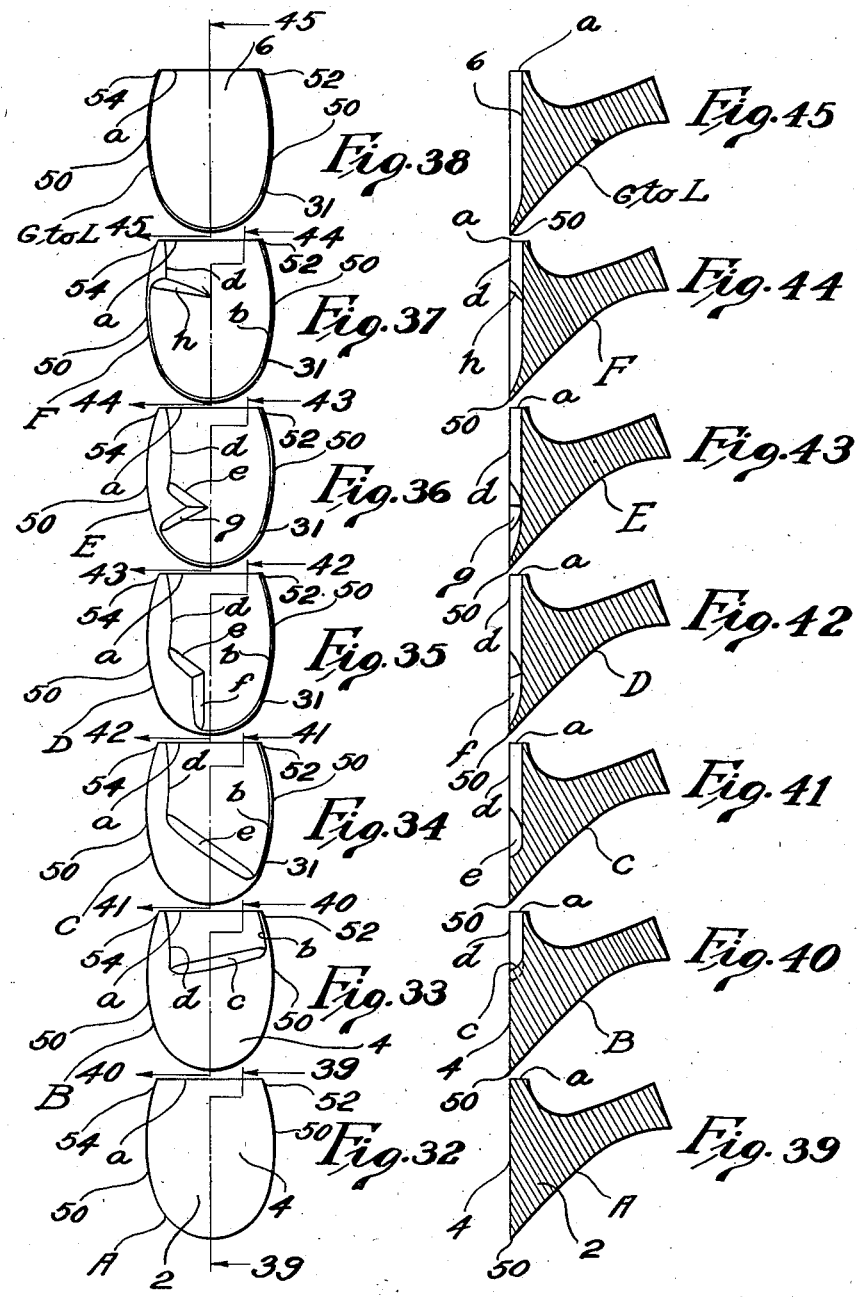

2,065,645

UNITED STATES PATENT OFFICE 2,065,645

HEEL CONCAVING MACHINE

Walter C. Brooks, Groveland, and John W. Staples, Haverhill, Mass., assignors to Pope Machinery Corporation, Haverhill, Mass., a corporation of Massachusetts Application October 7, 1929, Serial No. 397,918

19 Claims. (Cl. 12—46)

The present invention, though having also features of more general application, is more particularly related to machines for concaving wood-heel blocks.

The nature and the objects of the invention will be explained in connection with the accompanying drawings, in which Fig. 1 is a perspective of a machine constructed according to a preferred embodiment of the present invention, parts being omitted and other parts broken away for clearness;

Fig. 3 is a front elevation of the same;

Fig. 4 is a fragmentary elevation of a portion of the mechanism shown in Fig. 3, with the parts in different positions;

Fig. 6 is a horizontal section, upon a larger scale, taken upon the line 6—6 of Fig. 2, looking in the direction of the arrows, parts being broken away for clearness;

Fig. 7 is a horizontal section taken upon the line 7—7 of Fig. 2, looking in the direction of the arrows, the section being upon a larger scale than Fig. 2;

Fig. 8 is a left-side elevation of a portion of the mechanism shown in Fig. 2, but upon a larger scale;

Fig. 9 is a plan of the mechanism shown in Fig. 8;

Fig. 10 is a section taken upon the line 10—10 of Fig. 6, looking in the direction of the arrows, but upon a larger scale, parts being broken away for clearness;

Fig. 11 is a right-side elevation of a portion of the machine;

Fig. 12 is a vertical section taken upon the line 12—12 of Fig. 11, looking in the direction of the arrows, but upon a larger scale;

Fig. 13 is a vertical section taken upon the line 13—13 of Fig. 14, looking in the direction of the arrows;

Fig. 14 is a horizontal section similar to Fig. 6, showing the parts in different relative positions;

Fig. 16 is a vertical section taken upon the line 16—16 of Fig. 14, but upon a larger scale, looking in the direction of the arrows;

Fig. 17 is a vertical section taken upon the line 17—17 of Fig. 14, looking in the direction of the arrows;

Fig. 18 is a horizontal section taken upon the line 18—18 of Fig. 16, looking in the direction of the arrows;

Fig. 19 is a horizontal section taken upon the line 19—19 of Fig. 3, looking in the direction of the arrows;

Fig. 20 is a section similar to Fig. 19, but showing the parts in relatively different positions;

Fig. 21 is a vertical section taken upon the line 21—21 of Fig. 19, looking in the direction of the arrows;

Fig. 22 is a left-side elevation of a portion of the machine, showing the parts in relatively different positions from those of Fig. 2;

Fig. 23 is a diagrammatic view illustrating the path followed by the heel during the concaving operation;

Fig. 24 is a diagrammatic view showing the heel in its initial position;

Figs. 25, 26, 27 and 28 are further views, showing further steps in the operation;

Fig. 29 is a section taken upon the line 29—29 of Fig. 24, looking in the direction of the arrows;

Fig. 30 is a section taken upon the line 30—30 of Fig. 29, looking in the direction of the arrows;

Fig. 31 is a section taken upon the line 31—31 of Fig. 30, looking in the direction of the arrows;

Figure 52:
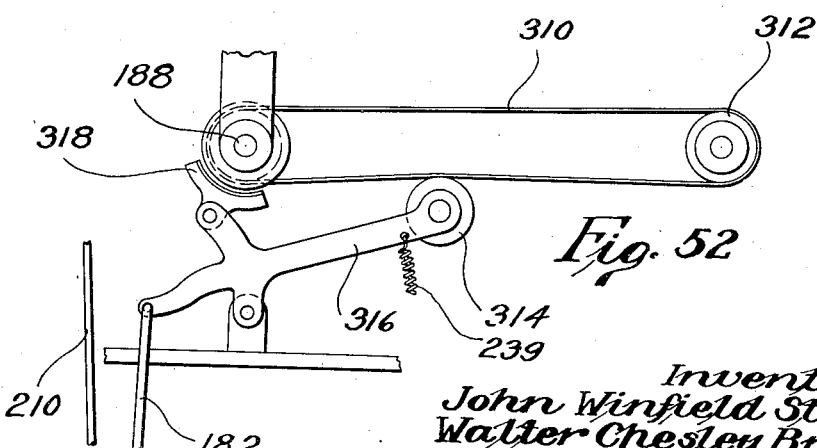

Figs. 32 to 38, inclusive, are plan views of a heel illustrating the successive cutting steps on the heel;

Figs. 39 to 45 are corresponding longitudinal sections of the heel taken upon the lines 39—39, 40—40, 41—41, 42—42, 43—43, 44—44 and 45—45, respectively, of Figs. 32, 33, 34, 35, 36, 37 and 38, respectively, looking in the direction of the arrows;

Fig. 46 is a section taken upon the line 46—46 of Fig. 3, looking in the direction of the arrows, and upon a larger scale;

Figs. 47 and 48 are sections similar to Fig. 46, showing the heel in different relative positions;

Figs. 49, 50 and 51 are sections taken upon the lines 49—49 of Fig. 46, 50—50 of Fig. 47 and 51—51 of Fig. 48, respectively, looking in the direction of the arrows; and Fig. 52 is a view of a modification.

A wood-heel block 2 is illustrated in Figs. 32 and 39 prior to the concaving operation. The machine of the present invention is intended to cut away the heel-seat portion 4 so as to produce a concaving cut 6. The heel is first placed, with the heel-seat portion 4 downward, upon a bed 8, and is clamped in position by a heel-holding jack in the manner illustrated more particularly in Figs. 1, 2, 3, 16 and 19, and as will be further described hereinafter. Immediately after being moved from such position, as hereinafter described, one corner 52 of the breast a of the heel is adapted to engage against a guide 56. The guide 56 is shown stationary, but it may be rotatable, as in the form of a freely rotating disk, if desired. The guide 56 is positioned a very small distance away from the active cutting edge of a rotary concaving cutter 10, corresponding to the width of the rib 31 left along the edge contour 50 of the heel seat (see Fig. 38). The heel is then moved about the rotary concaving cutter 10 in a curved path corresponding to the edge contour 50 of the seat 4 of the heel. The path of rotation of the cutter 10 is indicated in Fig. 30 by dot-and-dash lines. The initial position of the heel is diagrammatically shown at A in Figs. 1 to 3, 23 and 24. The heel is then actuated, with its edge contour 50 in engagement with the guide 56, along the path indicated by the arrows of Fig. 23, through the successive positions B to L, indicated, in dotted lines in Fig. 23, and in full lines in Figs. 25 to 28. During this movement of the heel, the rotary concaving cutter 10, situated adjacent to the path of movement of the edge contour of the seat 4 of the heel 2 cuts away successive portions of the heel seat 4, as illustrated more particularly in Figs. 32 to 45, to form a concave groove. The completely concaved heel is shown in Figs. 38 and 45. The cutting of the concave groove by the cutter 10 commences at the corner 52 of the breast $a$ of the heel, and continues without interruption, along the edge contour 50 of the heel, to the opposite corner 54. During the advance of the heel from the position A (Figs. 1, 23, 24, 32 and 39) to the position B (Figs. 23, 25, 33 and 40), the cutter 10 has cut away the heel-seat portion 4 of the heel along the boundary $a, b, c, d$. During the movement of the heel over the support or table 8, the cutter 10 follows the line $b$ substantially parallel to the contour 50, first along one side of the heel, from the corner 52, then along the back of the heel, and finally along the other side of the heel, to the opposite corner 54. Two concave grooves 252 and 254, as shown in Fig. 49, may thus be provided, the path of travel of the cutter 10, along the two sides of the heel, being shown by two circular dot-and-dash lines along the sides of the heel. A perceptible central rib 250, as will be hereinafter referred to, is often formed in the concave groove of the heel seat, at the intersection of the concave grooves 252 and 254, between the sides of the heel, but not along the back of the heel. These grooves 252 and 254 are formed when the heel occupies the positions B, C and E, F, respectively, corresponding to the positions illustrated in Figs. 33 and 34 and Figs. 36 and 37, respectively. The rib 250 is particularly noticeable when the heel seat is unusually wide.

In the position of Figs. 34 and 41, which correspond to the position C, the wall $c$ of Figs. 33 and 40 has advanced to $e$. In position D, Figs. 35 and 42, the cutter 10 has produced the cut $f$, at an angle to the line of cut $e$. In position E, Figs. 26, 36 and 43, the cut $f$ has been advanced to $g$. During the travel of the heel from position E to position F, represented by Figs. 37 and 44, the cut $g$ has been advanced beyond the line of cut $e$ to $h$.

Because the heel is held positively and firmly in place by a heel jack, as hereinafter described, it is possible to have the cutter 10 rotate always in the same direction, indicated by the arrows of Figs. 24 and 30, away from the edge contour 50 of the heel seat 4, and toward the center of the heel seat. This would not be possible if the heel were held lightly, or by hand. By reason of this cutting action of the cutter 10 in a direction away from the edge contour, and towards the center of the heel seat, all possibility of chipping the rib 31 left along the edge contour 50 of the heel is eliminated. The cutter is shown constituted of two cutter-bar knives 98, shaped preferably as in Fig. 30, to effectuate such purpose. By properly choosing the dimensions of the cutter bars 98, and using a properly chosen pattern or cam 12, hereinafter described, the central rib 250 can be almost wholly eliminated. It is well to use long cutter bars 98 in order to make the rib 250 as small as possible, but too long cutter bars would cut too far over to the opposite edge of the contour 50, which might result in marring the said opposite edge of the heel and chipping the rib 31.

The heel-holding jack is connected by mechanism, hereinafter to be described, with the pattern or cam 12, shown on larger scales in Figs. 6, 14 and 15. The pattern or cam 12 has an end portion 14, between the side portions 16 and 18, the edge contour of which corresponds substantially to the edge contour of the heel-seat portion of the heel 2. The opposite end portion 20 may be of any convenient shape, and its purpose will be hereinafter explained. The portion 20 of the pattern or cam is preferably very much narrower than the portion 14.

Figure 15:
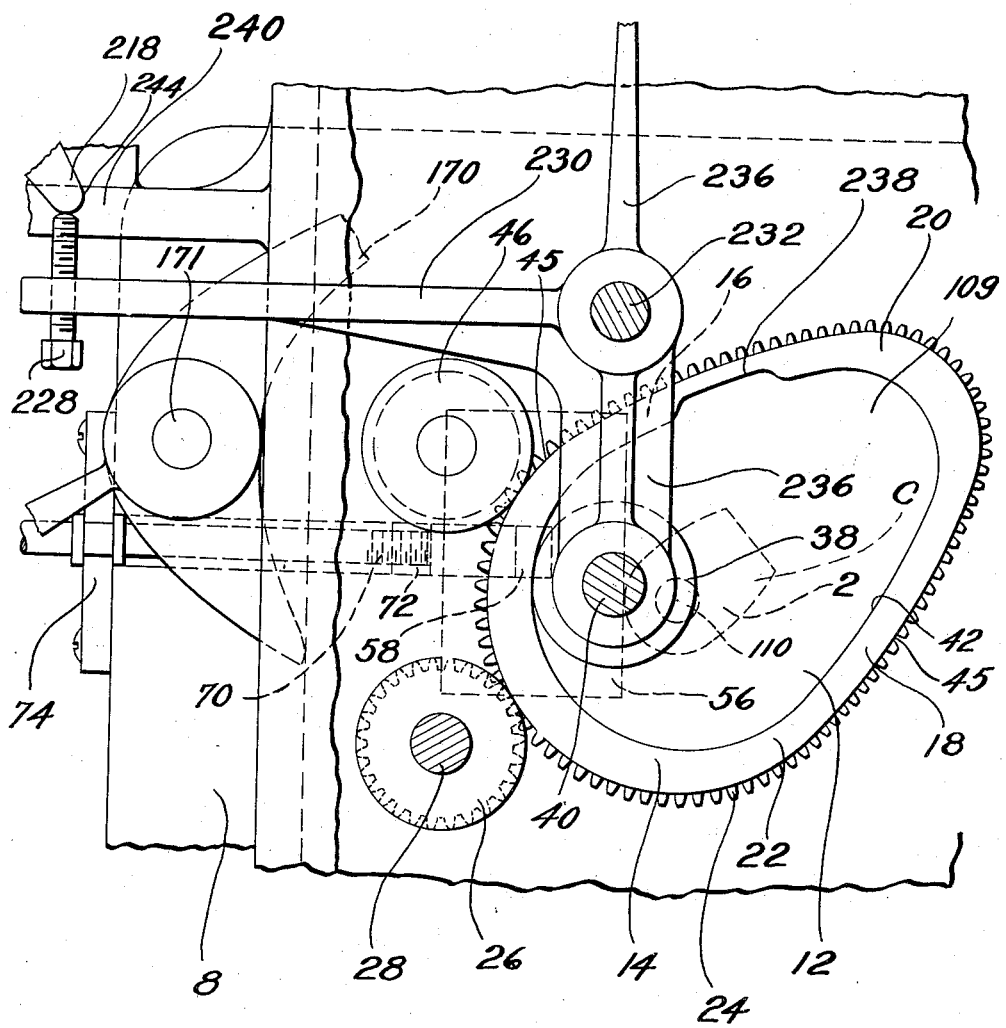
Fig. 15 is a fragmentary section similar to Fig. 14, but upon a larger scale, showing the parts in relatively different positions.

The heel 2 is held by the heel-holding jack in such position, as illustrated more particularly in dotted lines in Figs. 6, 14 and 15, that its contour 50 will be more or less parallel to the contour of the wider portion 14 of the cam 12. A wall 22 (see particularly Figs. 14, 16 and 17) stands up from the lower horizontal wall 109 of the pattern 12 along its edge contour. The wall 22 is thicker at the end portions 14 and 20 than at the side portions 16 and 18 to prevent an arm 230, hereinafter mentioned, from swinging at the end portions of the cam. Such swinging movement would tend to throw off the hereinafter-mentioned lug 218. The wall 22 is provided with gear teeth 24 meshing with the teeth of a pinion 26 that is mounted on a spindle 28 provided with a pulley 30 (see particularly Figs. 1 to 3).

The pulley 30 is driven by a belt 32 from a pulley 34 mounted upon a power-driven shaft 36, rotating freely within a stationary hollow shaft 33. The shaft 33 is secured by set screws 35 in a sleeve 37 that is fastened to a circular table 39, supported by legs 41. Posts 43, rising from the table 39, support the bed 8. The pulley 30 may be loosely connected to the shaft 28, as by means of a set screw 43, Fig. 2, for purposes of adjustment, and may be tightened thereon, after adjustment.

Power is thus transmitted to the pinion 26, the rotation of which results in a corresponding movement of the cam 12. During such movement, an idler roll 38, mounted upon a shaft 40, and that is spring-pressed against the inner face 42 of the upstanding wall 22 of the cam 12 by a spring 44, forces the upper smooth or untoothed portion 45 of the outer face of the cam 12 against an idler guide roll 46, as well as against the upper untoothed or roll part of the gear 26 (see Fig. 17). This construction will be more fully described hereinafter. The idler roll 38 on the inner face 42 of the wall 22 thus forces the outer face 45 of the wall 22 against the guide roll 46, causing the edge contour of the pattern to follow the guide 46 during the actuation of the pattern 12. The idler roll 46, therefore, in conjunction with the pinion 26 and the spring-pressed roll 38, determines the path of movement of the pattern or cam 12 and, therefore, of the heel held below the cam 12 by the heel-holding jack. This path of movement is such as to cause the heel to assume the successive positions A to L illustrated in Figs. 23 to 28. The cam 12 slides during such movement in a housing formed in a hollowed-out section of a bracket or arm 51, hereinafter described. The upper and lower walls of the housing constitute guide plates between which the cam 12 moves.

During the time that the teeth of the pinion 26 engage the teeth 24 of the wide portion 14 of the cam, between the points 16 and 18, the heel 2 travels through the positions A to G. During the travel of the pinion 26 over the remaining, narrower portion 20 of the cam, the heel is merely carried, through the positions H to L, back to its initial position A. The exact shape of the portion 20 of the cam 12 is unimportant, except that it should be such that the heel shall be speedily returned to its initial position entirely out of range of the action of the cutter 10, as will be understood from Fig. 23. The cutter 10 is thus prevented from marring or injuring the completed heel during the return travel of the heel from the position G to the position A.

Theoretically, the shape of the portion 14 of the cam 12 should correspond exactly to the shape of the edge contour 50 of the heel 2. It would then be necessary, however, to have a separate cam portion 14 corresponding to each different contour 50 of each heel seat 4. According to the present invention, therefore, provision is made for using a single cam-shaped portion 14 with a wide variety of heel-seat contours 50 and, indeed, with all heel-seat contours that are met with in actual practice. This result is brought about, according to the specific embodiment of the invention that is illustrated and described herein, by providing for a lost-motion connection between the cam 12 (and the heel-holding jack carried thereby) and the guide 56. To this end, the cam 12 (and the heel-holding jack carried thereby) are supported upon the before-mentioned bracket or arm 51. The arm 51 is freely pivoted about the hollow shaft 33 (see more particularly Figs. 1 and 6). The arm 51 is biased toward the left, as viewed in Figs. 6 and 14, into engagement with a stop 49 (see more particularly Figs. 6 and 13), by a coil spring 53, one end of which is fixed to an upstanding lug 55 of the arm 51, and the other end of which is secured to a stationary part 57 of the machine. In this manner, the bracket 51 is moved, during the actuation of the pattern, in opposition to the action of the spring 53, to compensate for the difference in shape between the edge contours of the pattern and the heel seat. In order to adjust the tension of the spring 53, the said other end of the spring is secured to the part 57 not directly, but indirectly, through an adjustable bolt 59, extending through an opening 61 in the stationary part 57. The bolt 59 is capable of moving longitudinally through the opening 61, but is held against rotation therein by a key 63 (Figs. 10 and 13). Longitudinal adjustment of the bolt 59 is effected by the rotation of a nut 65 that is threaded upon the bolt 59 and that bears against a face 67 of the stationary part 57. A projection 69 of the stationary part 57 is adapted to extend into a corresponding recess 71 of the nut 65 to prevent accidental rotation of the nut 65.

The heel 2 will, therefore, by the engagement of its edge contour 50 with the guide 56, force the arm 51 about the pivotal shaft 36 away from the stop 49, to the right, into the dotted-line position of Fig. 6, in opposition to the force exerted by the spring 53. The said dotted-line position of the arm 51 continually changes as different parts of the edge contour 50 engage the guide 56. A lost-motion connection is thus provided to compensate for the difference in shape between the part 14 of the cam 12 and the edge contour 50 of the heel seat. Indeed, it is found preferable, in practice, to have the arm 51 always out of engagement with the stop 49 during the cutting operation of the cutter, the arm 51 returning to the full-line position of Fig. 6, to engage the stop 49, only when the heel has been removed from engagement with the guide 56. The stop 49 may be longitudinally adjusted to the right or the left, as viewed in Fig. 13. To this end, it may be constituted of a bolt, threaded in a threaded opening 73 of the part 57 of the frame, and held in adjusted position by a lock nut 75.

Figure 1:
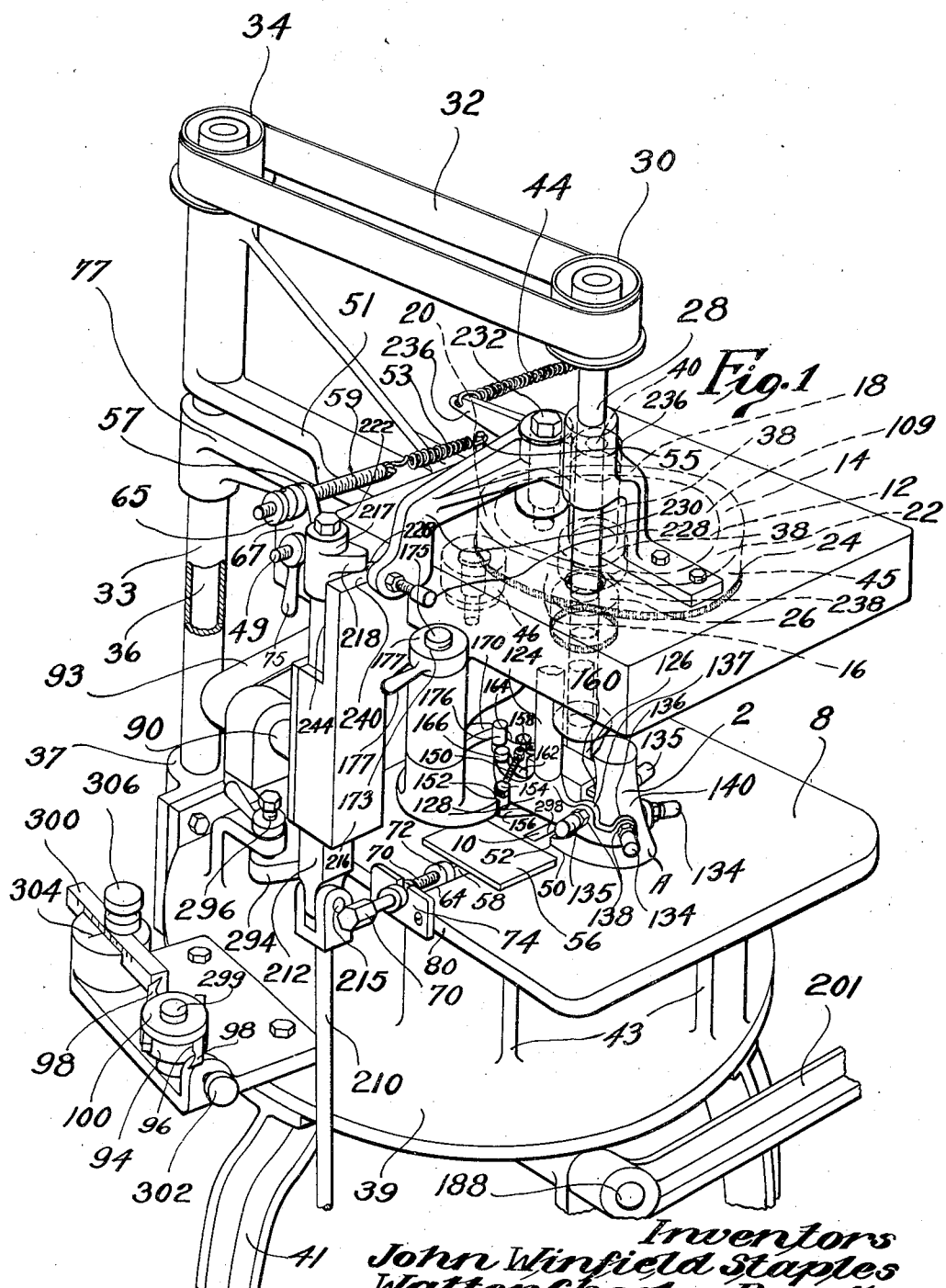
Figure 2:
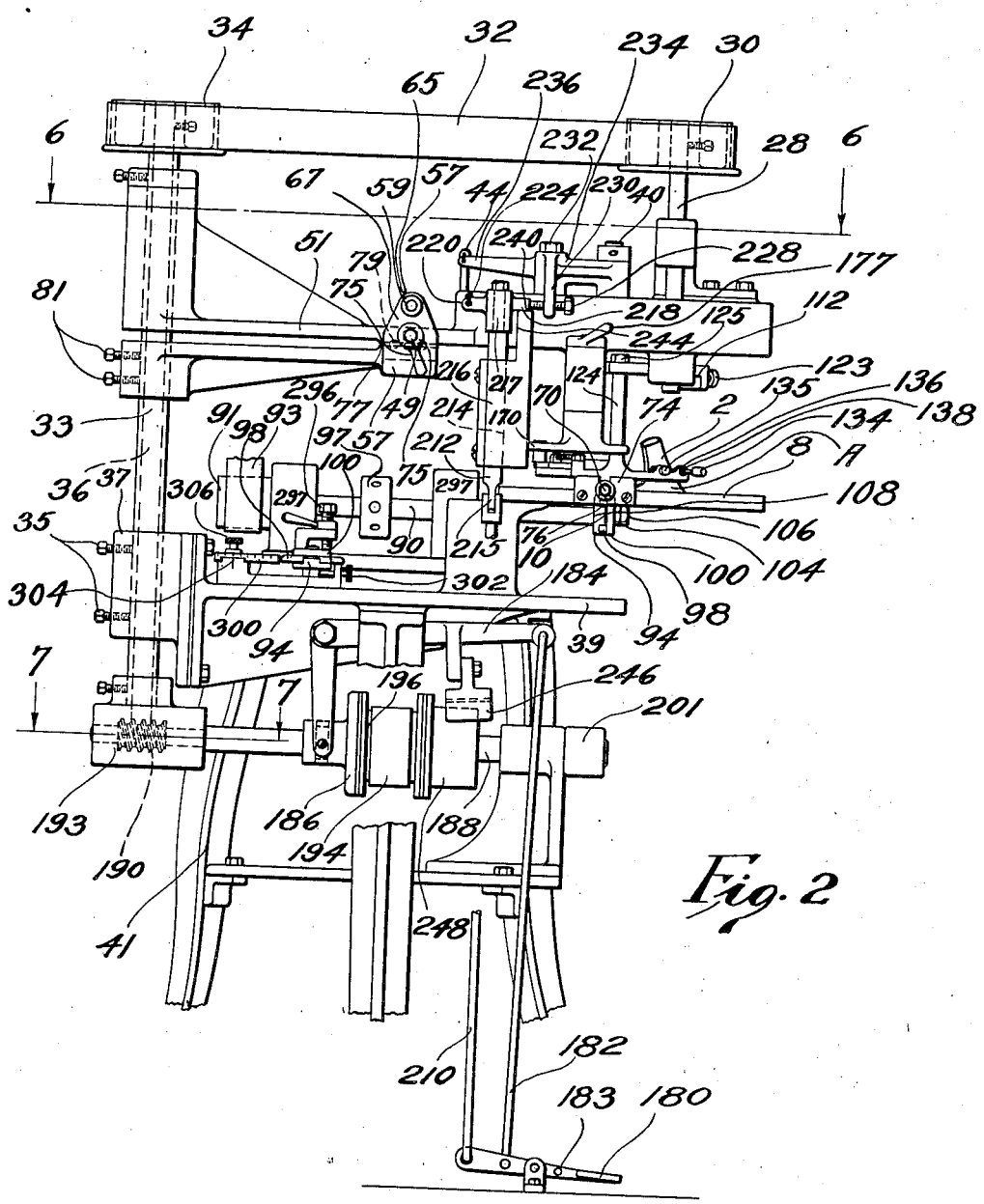
Fig. 2 is a left-side elevation of the same.

As the arm 51 is thus continuously swaying to the left and to the right, about the pivotal shaft 33, during the heel-concaving operation, it is well to have it supported upon a stationary portion 77, shown as a bracket, that may be fixed to the hollow shaft 33 in any desired manner, as by set screws 81, Fig. 2. The provision of the supporting bracket 77 prevents the arm 51 binding against the hollow shaft 33 during the pivotal movement of the arm 51 in a horizontal plane. Ball bearings or other anti-friction means 79 are provided between the arm 51 and the frame portion 77. The cam 12, the heel jack that moves therewith, and the gear 26 and the shaft 28 that drives the same, as well as other mechanisms later to be described, are all carried by the arm 51 and swing therewith as a unit.

A method that is found very effective in practice is to have the arm 51 engage the stop 49 when the points 52 and 54, and also the extreme back point of the contour 50, engage the guide 56, but to have the arm 51 disengaged from the stop 49 when other portions of the contour 50 engage the guide 56. It will not always happen that the said three points will engage the guide 56 with equal force and the lightest pressure should be exerted upon the said extreme back point of the contour 50 instead of against either the point 52 or the point 54.

The guide 56 is secured to a stem 58. The stem 58 and a lug 72 are carried by a connecting bar 62. The stem 58 is slidably mounted in a guide 60 provided in a portion 80 of the table 8 (see more particularly Figs. 1, 15 and 30). The connecting bar 62 is slidably mounted in an undercut groove 64 of the portion 80 of the table 8, and may be adjusted back and forth in the groove by means of a screw-threaded member 70 tapped in the lug 72 of the plate 62. If desired, the guide plate 56 may be made integral with the stem 58, in which event, however, the undercut groove 64 should be positioned in the upper part of the table 8, instead of in the lower part, as shown in Figs. 30 and 31. The member 70 extends through and may be locked in a plate 74. The plate 62 may be clamped in adjusted position in any desired way, as by means of a bolt 76 passing through an elongated opening 78 in the plate 62 and tapped in the portion 80 of the table 8. Provision is thus made for adjusting the position of the guide 56 relative to the effective cutting position of the cutter 10, thereby adjusting the width of the rib 31 along the edge contour 50 of the heel.

In order to permit the cutter 10 to cut the heel seat 4 of the heel 2 the proper distance from the edge contour 50 in all positions of the heel, it is found advisable to have the central portion of the guide 56 project out at an incline, near the cutter 10, as illustrated at 81, Fig. 26. This is not illustrated in the other figures, because the incline needs to be very slight. The projecting point 81 may, furthermore, be provided with a depending portion extending into the opening 60, the better to hold the guide firmly in position during the concaving operation and also to prevent the edge contour 50 catching between the guide 56 and the table 8.

Figure 5:
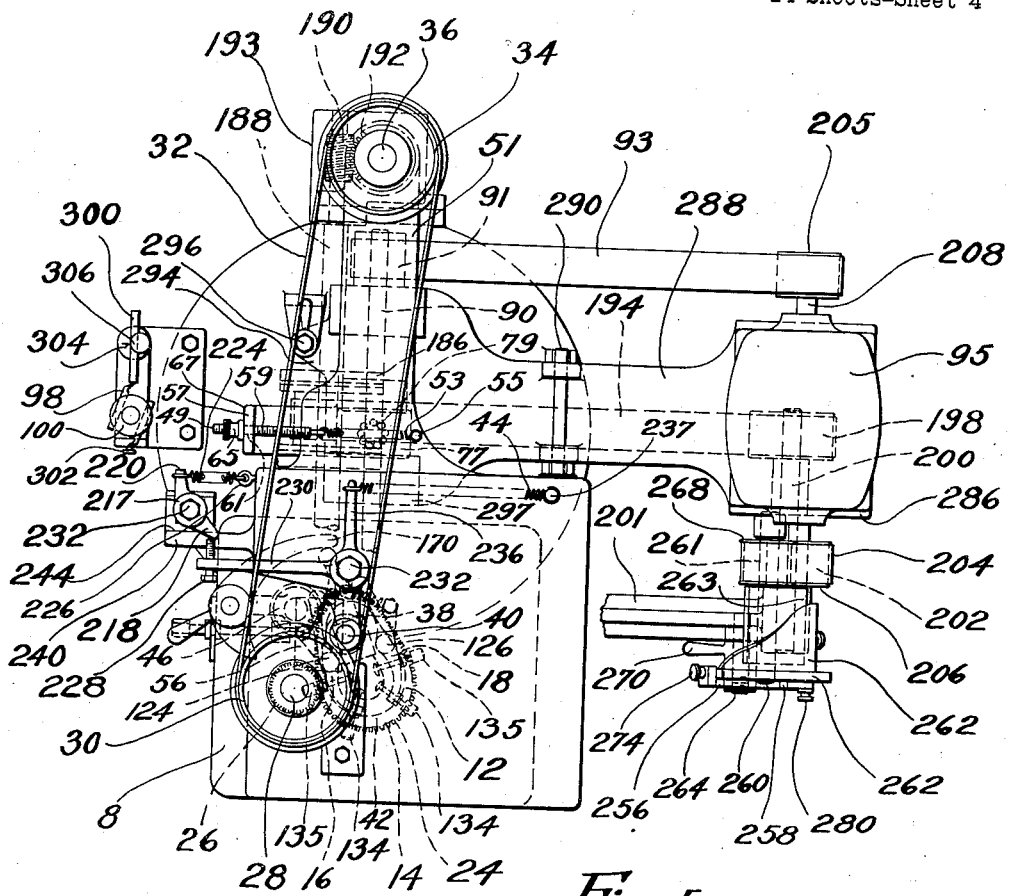
Fig. 5 is a plan of the machine.

The cutter 10 is mounted upon a ball-bearing spindle or shaft 90, provided with a pulley 91, over which passes a belt 93 that is driven from a pulley 205 upon the shaft 208 of a motor 95 (Figs. 3, 5 and 11). The shaft 90 is provided with a reduced portion 92 (Figs. 24 and 29). A shoulder 108 separates the reduced portion 92 from the main portion of the shaft 90. A bushing 94, provided with transversely disposed, U-shaped openings 96, and a threaded, projecting sleeve 102, is held on the reduced portion 92 of the shaft 90 against the shoulder 108. The cutter portions or bars 98 of the cutter 10 are held in place in the openings 96 by a nut 100, threaded upon the threaded projecting sleeve 102. Each cutter bar 98 projects outward through the open side of the U of the opening 98, as shown in Fig. 29, so as to be directly engaged by the nut 100. The bushing 94 and the nut 100 thus serve as a holder 94, 100 to hold the cutter bars 98 between them. The cutter bars 98, with the holder 94, 100 therefor, are held tightly in position against the shoulder 108, by nuts 104, threaded upon a terminally-threaded portion 106 of the shaft 90. The cutter bars 98 may be readily removed merely by unscrewing the nuts 104 and 100. The shaft 90 is held stationary during such unscrewing of the nuts 104 by means of a pin (not shown) placed in openings 97 carried by an enlargement of the shaft 90 (Fig. 2). This construction, furthermore, makes it possible to obtain a very precise longitudinal adjustment of the cutter-bar knives 98, as will be described hereinafter in connection with Figs. 8 and 9.

It is now in order to describe how the heel-holding jack is carried by the cam 12 so as to move therewith. Referring more particularly to Fig. 16, the lower horizontal wall 109 of the cam 12 has integral therewith a boss 111 within which is carried a vertically depending rod 110 to which a plate 112 is adjustably clamped. The adjustable clamping may be effected in any desired way as, for example, by providing the plate 112 with an elongated polygonal slot 114 (Figs. 16 and 18) for receiving a correspondingly-shaped reduced portion 116 at the bottom of the projecting boss 111. The plate 112 is held against a shoulder 118 formed between the reduced portion 116 and the main portion of the projection 111. The plate 112 may be adjusted longitudinally of itself,—the reduced portion 116 traveling in the opening 114,—by a bolt 120, threaded into a transversely threaded opening 121 in a square-shaped head 119 of the depending rod 110. The bolt 120 is passed freely through an opening 122 in the plate 112, and a knob 123 terminally provided upon the bolt 120 bears against a wall 125 of the plate 112. Mere rotation of the knob 123 will thus effect horizontal adjustment of the plate 112. A shoulder 127 on the bolt 120 holds the bolt 120 and, therefore, the plate 112, in horizontally adjusted position. The plate 112 may be so adjusted that the edge contour 50 of a properly shaped heel, held by the heel-holding jack, shall be brought into contact with the guide 56; or, stated more accurately, so that the edge contour 50 shall, during the movement of the heel, be spaced a constant distance, equal to the thickness of the rib 31, from the point where the cutter 10 commences to cut into the heel seat 4. In practice, as before described, variations between the shape of the cam 12 and that of the edge contour 50 are compensated for by the automatic pivotal take-up movement of the arm 51, so that the difference in shape between the edge contours of the cam and the heel is compensated for, and the edge contour of the heel is spaced the said constant distance from the cutter during the movement of the heel.

Two rods 124 and 126 depend from the plate 112, being secured thereto in any desired way, as by means of nuts 125, and are respectively provided at their lower ends with intermediately pivoted clamping levers 128 and 130 (see more particularly Figs. 18 to 20). One end of each of these levers is provided with two clamping jaws 132 and 133, shown in the form of bolts 134 and 135. The bolts 134 and 135 are threaded in screw-threaded eyes 136 and 137, formed respectively at the end, and intermediately, of each lever 128 and 130, and are held in place in any desired manner, as by means of lock nuts 138. It is thus possible to adjust the jaws 132 and 133 in and out through the terminal screw-threaded eyes 136 and 137 of the clamping levers 128 and 130. The clamping jaws 132 are designed to engage against the respective tapering sides 140 and 142 of the heel, near the back of the heel, as shown more particularly in Fig. 19, and are adjusted so as not merely to clamp the heel against the support 8, but also to force the breast of the heel against an adjustable gauge 179. The jaws 133 engage the sides 140, 142 of the heel at points near the breast of the heel, and serve to center the heel. An intermediate portion 144 (Fig. 21) of the breast of the heel engages against an end 148 of a reciprocative plunger 160. The jaws 132 and 133 automatically clamp the heel against the gauge, besides centering it. Two jaws 132 will operate, but it is preferred, in practice, to employ also the additional jaws 133.

One end of each rod 152 is swiveled at 154 upon a stationary part 156 of the heel jack, and the other end 158 is pivoted to the before-mentioned reciprocating plunger 160. One end of the plunger 160, as before mentioned, is initially engaged by the breast of the heel. The other end carries a roll 176. The plunger 160 is intermediately provided with two high-cam portions 162 and two low-cam portions 164 for engaging rolls 166 at the other ends of the levers 128 and 130. When the rolls 166 engage the high-cam portions 162, the jaws 132 and 133 engage the tapering sides 140, 142 to hold the heel in place, as before described, and as shown in Fig. 19. When the rolls 166 engage the low-cam portion 164, as illustrated in Fig. 20, however, the jaws 132 and 133 are opened out, and can not engage the heel. Whether the rolls 166 shall engage the portions 162 or the portions 164 depends upon the position occupied by the plunger 160. When a heel is inserted between the jaws 128 and 130 the plunger or slide 160 is moved thereby until the rods 152 are moved past dead center whereupon the springs 150 force the plunger to its outermost position to bring the rolls 166 in engagement with the cams 162. The plunger is moved in the opposite direction when the roll 176 on the plunger 160 engages the stationary cam arm 170. The cam arm 170 is provided, for adjustment purposes, with a stem 171, extending through an opening 173, and provided with a threaded terminal 175, by means of which the cam arm 170 may be locked in adjusted position through the use of a nut 177.

The plunger 160 may be automatically forced, at a predetermined point in the cycle of operation, from the position of Fig. 19 into that of Fig. 20, merely by engagement of the roll 176 with the cam arm 170. The end 148 of the plunger 160 thereupon engages the breast portion 144 of the heel to eject the heel from between the jaws 132 and 133. The jaws 132 and 133 open out at the same time, by reason of the action of the rolls 166 against the cam faces 164, to permit such operation. To recommence the next cycle of operations, the operator, with his fingers, merely pushes the heel over the support 8 inward from the position of Fig. 20 to that of Fig. 19, into engagement with the gage 179. In so doing, the breast portion 144 of the heel engages the end 148 of the plunger 160 to force the plunger 160 backward from the position of Fig. 20 to that of Fig. 19. The rolls 166 at the same time ride from the low-cam portions 164 on to the high-cam portions 162, and cause the jaws 132 and 133 again to engage the tapering sides 140 and 142 of the heel and hold the heel in place, centered, in readiness for a next cycle of operations.

The cycle of operations may be commenced by means of a treadle 180 which, through a treadle rod 182, and a bell-crank lever 184, causes (Figs. 2 and 22) a clutch 186 to be set into operation. The details of the clutch 186 are not illustrated herein, because forming, in themselves, no essential part of the present invention. Indeed, as illustrated in Fig. 52, other forms of clutch mechanism may be employed without in any way departing from the spirit or scope of the present invention. The clutch 186 sets into operation a shaft 188 (see particularly Fig. 2) provided at one end with a worm 190 (Fig. 7) meshing with a worm wheel 192 provided upon the shaft 36. The worm 190 and the worm wheel 192 are housed in a casing 193. In this manner, power is transmitted from the shaft 188 to the shaft 36 that, as before described, drives the gear 26 for operating the cam 12. The shaft 188 is driven from the motor 95, that also operates the cutter 10, as before described. This is effected by a belt 194 (Figs. 2 and 3) mounted over a pulley 196 intermediately located on the shaft 188, and over a pulley 198 upon a shaft 200. The shaft 200 is carried at one end of an arm 201, the other end of which is pivoted freely about the shaft 188. The shaft 200 carries a second pulley 202 (Fig. 11) over which passes a belt 204 that is driven by a pulley 206 upon the shaft 208 of the motor 95. The pulleys 205 and 206 are mounted at opposite ends of the shaft 208. The arm 201 hangs upon, and is supported by, the belt 204, so as to serve as a belt tightener.

At the same time that the treadle rod 182 starts the operation of the shaft 188, a second treadle rod 210, connected to the same treadle 180, raises a bar 212, the lower end of which is linked to the treadle rod 210 at 215. The bar 212 is square in cross section and is adapted to slide vertically in a correspondingly square opening 214 (Figs. 2, 6, 14, 22) provided in a stationary portion 216 of the frame of the machine. The upper end of the bar 212 carries an arm 217 one end of which is provided with a lug 218, and the other end with a lug 220 (see particularly Figs. 6, 14 and 22). The arm 217 is intermediately pivoted to the bar 212 at 222 so as to rock in a horizontal plane. A coil spring 224, one end of which is fixed to the lug 220, and the other end to a stationary part 226 of the arm 51, tends to actuate the arm 217 into engagement with a part 228 of an arm 230. In order that the part 228 may be adjustable upon the arm 230, it is shown as a bolt. The arm 230 is integral with two other arms 234 and 236 to constitute a three-armed lever 230, 234, 236 that is pivotally mounted about a vertically disposed spindle 232. The arm 234 carries the shaft 40 upon which the idler roll 38, before referred to, is rotatably mounted. One end of the spring 44 is connected with the arm 236 and the other end is fastened at 237 to the arm 51. It is in this manner that the arm 234, that carries the idler roll 38, is caused to pivot toward the left, as viewed in Figs. 6 and 14, about the spindle 232. At the same time, the arm 230, with the bolt 228 carried thereby, is biased by the spring 44 in a corresponding direction to cause the bolt 228 to engage the lug 218.

Upon the raising of the treadle 180, the machine will go through its complete cycle of operations. Not until the end of the cycle, when the roll 38 returns to a dwell 238, as illustrated in Fig. 6, will the bolt 228 be able to force the lug 218 from the position of Fig. 14 back to that of Fig. 6. During all this time, and until the idler roll 38 returns to the dwell 238, the lug 218 rests upon the upper face 240 of the stationary part 216 of the machine, and so the treadle may be released immediately after it is depressed without the treadle rod returning to its initial position by gravity. Gravity may be aided by a spring 239, as shown in Fig. 52. As soon as the bolt 228 effects the movement of the lug 218 into the position of Fig. 6, however, the lug 218 is driven off from its supporting face 240, and the treadle rods 182 and 210 are now enabled to return by gravity, with the treadle 80, to their initial position. The lug 218, during such return, rides vertically downward in contact with a vertical face 244 of the stationary part 216 of the machine. A brake 246, mounted upon the bell-crank lever 184, thereupon engages a brake wheel 248 so as to stop the shaft 188 from rotating further. In this manner, the machine will go through its complete cycle of operations, before described, carrying the heel from the initial position A, through the positions B to L, and back to the position A again, to effect the concaving of the heel seat; and, at the end of the cycle of operations, the clutch will become thrown out and the brake applied to stop the machine.

It has before been stated that other mechanisms than the clutch 186 may be employed without departing from the spirit or scope of the present invention. One such mechanism is disclosed in Fig. 52, where the shaft 188 is shown as driven by a belt 310 from any desired source of power 312. The belt 310 is normally loose, but may be tightened by a belt tightener 314 carried upon an arm 316 that may be set into operation through the treadle rod 182, connected, in this case, with the opening 183 of the treadle 180 (see Fig. 22). Upon the release of the treadle rod, a brake 318, carried by the arm 316, will operate to stop the movement of the shaft 188, as before described.

As before stated, the roll 38 drops into the dwell 238 at the end of the cycle. Just before this happens, the cam 12, and the heel-holding jack carried thereby, are moved in such fashion that the parts assume the positions shown in Fig. 19, with the result that the roll 176 hits against the cam 170. The roll 176 is thus forced inward by the cam 170, in opposition to the force exerted by the springs 150, causing the plunger 160 to be forced inward from the position of Fig. 19 to that of Fig. 20, ejecting the heel. The machine is now ready for the commencement of another cycle of operations. This new cycle is commenced, as before described, by the operator first bodily pushing the heel inward from the position of Fig. 20 to that of Fig. 19, and operating the treadle 180.

As soon as the plunger 160 ejects the now-concaved heel, the operator seizes it with his fingers, lifts it off the table 8, and proceeds to remove the before-mentioned rib 250, if desirable. In order to remove the rib 250, the operator places the heel in the portion of the machine shown at the right of Figs. 3 and 4 (see also Fig. 5), with the breast a of the heel seat above a gage 256, and with a side of the heel-seat contour 50 against a gage 258. The operator then moves the heel downward, as viewed in Fig. 3, along the gage 258. In so doing, the heel assumes the positions successively indicated in Figs. 46, 47 and 48, reaching, finally, the position shown in dotted lines in Figs. 3 and 12. The rotary rib cutter 260 is thus caused to remove the rib 250. The cutter 260 is mounted upon a cutter shaft 261, bearing in a bracket 263 (Fig. 11) that is carried upon an arm or rest 262. The arm or rest 262 is pivoted about a shaft 264 so as to pivot in a vertical plane. The shaft 264 is carried upon a lug of the pivoted arm 201. The cutter shaft 261 carries a pulley 268 that is adapted, in one limiting position of pivotal movement of the rest 262, to engage the belt 204. As soon as this engagement is effected, the cutter 260 is set into operation by the belt 204 acting on the pulley 268. The cutter 260 stops operating when the pulley 268 is disengaged from the belt 204. A handle 270 may be manipulated to cause the pulley 268 to be moved into or out of engagement with the belt 204, and a handle 272 is adapted to lock the rest 262, carrying the pulley 268, in either the effective position or the ineffective position. The effective position is shown in Fig. 3, and the ineffective position in Fig. 4.

The gages 256, 258 are adjustable so as to accommodate different sizes and shapes of heels. The gage 256 may be adjusted by means of a screw 274 passing through an opening 276 in the gage 256 and tapped into a threaded opening 278 of the rest 262. The gage 258 is similarly adjustable by means of a threaded screw 280 passing through an opening 282 in the gage 258 and tapped into an opening 284 of the rest 262. The arm or rest 262 is itself adjustably mounted on the bracket 263 by means of a threaded screw 287, passing through an opening 289 (Figs. 11 and 12) and tapped into an opening 291.

The motor 95 is carried at one end 286 of an arm 288 that is intermediately pivoted at 290 to the frame of the machine, the other end 294 of the arm 288 being adapted to engage an adjustable stop 296. The arm 288 carries the cutter 10, the shaft 90 upon which it is mounted, and its other associated mechanisms, these parts being disposed between the pivot 290 and the end 294 upon a bracket 297. The weight of the motor 95 thus causes the cutter 10 to be forced upward through an opening 298 (Figs. 1, 29 and 30) in the table 8, and to be maintained raised to a height determined by the adjustment of the stop 296. A very simple adjustment is thus provided for the depth of the concave groove produced in the heel seat.

In order to permit adjusting the depth and radius of the concave groove, provision is made for adjusting the position of the cutter bars 98 upon the shaft 90. To this end, the holder 94, 100 may be mounted on a stem 299 rising up from the frame of the machine, as illustrated in Figs. 1, 2, 5, 8, 9 and 29, near a scale 300. The stem 299, the scale 300, and associated parts, may be positioned upon any convenient portion of the machine. The pin 302 serves to bind against the holder 94 while loosening or tightening the nut 100. The holder 94, 100 may be rotated about the stem 299, causing the cutter bars to engage against the scale 300, permitting identical adjustment of both cutter bars. The scale 300 is set in connection with an index 304 and clamped in position by a screw 306. When a specified depth of concave cut is desired, as determined by prior experiments, the cutter bars 98 may be adjusted back and forth in the holder 94, 100 until they just touch the end of the previously set scale 300. It is then known that the cutter bars 98 are set properly for the concaving of any particular heel seat. The holder may then be removed from the stem 299 and remounted upon the shaft 90 as before described.

Other modifications, too, will occur to persons skilled in the art, and all such are considered to fall within the spirit and scope of the present invention, as defined in the appended claims. The edge contour of the seat of the heel refers to the entire edge contour of the heel seat minus that portion formed by the intersection of the breast of the heel with the heel seat.

What is claimed is:

1. A machine for concaving heels having, in combination, a pattern having an edge contour a part of which corresponds substantially to the edge contour of the seat of a heel, means for actuating the pattern, a guide, means for causing the edge contour of the pattern to follow the guide during the actuation of the pattern, means for causing the heel to be moved with the pattern, and a concaving cutter situated adjacent to the path of movement of the edge contour of the seat of the heel and adapted to produce a concaving cut in the seat of the heel during the movement of the heel.

2. A machine for concaving heels having, in combination, a pattern having an edge contour a part of which corresponds substantially to the edge contour of the seat of a heel, means for actuating the pattern, a guide, means for causing the edge contour of the pattern to follow the guide during the actuation of the pattern, a heel jack carried by the pattern, a concaving cutter adapted to produce a concaving cut in the seat of a heel held by the jack during the movement of the heel, and means for adjusting the position of the jack upon the pattern.

3. A machine for concaving heels having, in combination, a pattern, means for actuating the pattern, a guide means for causing the edge contour of the pattern to follow the guide during the actuation of the pattern, means for causing a heel to be moved with the pattern, a concaving cutter situated adjacent to the path of movement of the edge contour of the seat of the heel and adapted to produce a concaving cut in the seat of the heel during the movement of the heel, and means for compensating for the difference in shape between the edge contours of the pattern and the seat of the heel to cause the edge contour of the seat of the heel to be spaced a constant distance from the cutter during the movement of the heel.

4. A machine for concaving heels having, in combination, a pattern, means for actuating the pattern, a pattern guide, means for causing the edge contour of the pattern to follow the pattern guide during the actuation of the pattern, means for causing a heel to be moved with the pattern, a heel guide, means for compensating for the difference in shape between the edge contours of the pattern and the seat of the heel to permit the edge contour of the seat of the heel to contact the heel guide during the movement of the heel, and a concaving cutter situated adjacent to the heel guide and adapted to produce a concaving cut in the seat of the heel during the movement of the heel.

5. A machine for concaving heels having, in combination, a bracket, a pattern carried by the bracket, means for actuating the pattern, a guide carried by the bracket, means for causing the edge contour of the pattern to follow the guide during the actuation of the pattern, means for causing a heel to be moved with the pattern, and a concaving cutter situated adjacent to the path of movement of the edge contour of the seat of the heel and adapted to produce a concaving cut in the seat of the heel during the movement of the heel, the bracket being movable during the actuation of the pattern to compensate for the difference in shape between said heel seat contour and the corresponding portion of the edge contours of the pattern to cause said edge contour of the seat of the heel to be spaced a constant distance from the cutter during the movement of the heel.

6. A machine for conveying heels having, in combination, a bracket pivoted about an axis, a pattern carried by the bracket, the pattern having a wall standing up from the pattern along its edge contour, the wall being provided with gear teeth, a pinion carried by the bracket and having gear teeth meshing with the pattern gear teeth, means for rotating the pinion, means for maintaining the pinion gear teeth in mesh with the pattern gear teeth during the rotation of the pinion, means for causing a heel to be moved with the pattern, a guide, means yieldingly biasing the bracket to cause the edge contour of the seat of the heel to contact the guide during the rotation of the pinion, and a concaving cutter situated adjacent to the guide and adapted to produce a concaving cut in the seat of the heel during the movement of the heel.

7. A machine for concaving heels having in combination, a concaving cutter, means for holding a heel, means for actuating the holding means about the cutter from an initial position back to the initial position in a curved path during which the seat of the heel is brought into engagement with the cutter progressively along a path parallel to the edge contour of the heel seat, and means for rendering the actuating means ineffective upon the return of the heel to the initial position.

8. A machine for concaving heels having, in combination, a pattern having an edge contour a portion of which corresponds substantially to the edge contour of the seat of a heel, means for actuating the pattern, a guide, means for causing the edge contour of the pattern to follow the guide during the actuation of the pattern, means for causing the heel to be moved with the pattern, and a concaving cutter situated adjacent to the path of movement of the edge contour of the seat of the heel and adapted to produce a concaving cut in the seat of the heel during the movement of the heel from an initial position to a second position and corresponding to the following up of the guide by the said portion of the pattern edge contour, the pattern edge contour having a second portion, the heel being adapted to be moved from its second position to the initial position during the following of the guide by the said second portion of the pattern edge contour, and the heel being out of range of the action of the cutter during its movement from the second position to the initial position.

9. A machine for concaving heels having, in combination, a pattern having an edge contour a part of which corresponds substantially to the edge contour of the seat of a heel, the pattern having a wall standing up from the pattern along its edge contour, means for actuating the pattern, a guide, means engaging one side of the wall for causing the other side of the wall to engage the guide during the actuation of the pattern, means for causing the heel to be moved with the pattern, and a concaving cutter situated adjacent to the path of movement of the edge contour of the seat of the heel and adapted to produce a concaving cut in the seat of the heel during the movement of the heel.

10. A machine for concaving heels having, in combination, a support, a concaving cutter projecting above the support, means for holding a heel on the support with the seat of the heel in engagement with the support and for actuating the seat of the heel into engagement with the cutter to cause the cutter to produce a concaving cut in the seat of the heel, a second support, a pivot for the second support, a motor on one side of the pivot of the second support for actuating the cutter, and an adjustable stop on the other side of the pivot of the second support for adjusting the degree of projection of the cutter above the first-named support.

11. In combination, a support upon which a heel block is adapted to rest with the seat of the heel in engagement with the support, and four jaws for engaging the sides of the heel to hold the heel against the support, two of the jaws engaging the sides of the heel near the breast of the heel and the other two engaging the sides of the heel near the back of the heel.

12. In combination, a support, means for clamping an article on the support including a movable clamping member adapted to engage the article, a movable slide having a cam surface, and an operative connection between said clamping member and cam surface whereby movement of said slide to a predetermined position locks said clamping member against the article.

13. In combination, a support, means for clamping an article on the support including a movable clamping member adapted to engage the article, a movable slide having a cam surface, an operative connection between said clamping member and cam surface, and means operative when said slide has been moved a predetermined amount to move the slide further automatically to lock the clamping member against the article.

14. In combination, a support, means for clamping an article on the support including a movable clamping member adapted to engage the article, a slide movable to engage the article, and operative connections between the slide and clamping member operative upon movement of the slide in one direction to clamp the article upon the support and upon movement of the slide in the opposite direction to permit ejection of the article.

15. In combination, a support, a pair of pivotally mounted arms, one end of each of said arms being arranged to engage an article to position and hold it on said support, and a slide movable to engage the article and having a cam surface adapted to engage the other ends of said arms whereby movement of the slide in one direction locks said arms in engagement with the article and movement in the opposite direction ejects the same.

16. In combination, a support, a pair of pivotally mounted arms, a stop, one end of each of said arms being arranged to engage an article to position and hold it against said stop and support, a slide movable to engage the article and having a cam surface adapted to engage the other ends of said arms whereby movement of the slide in one direction locks said arms in engagement with the article and movement in the opposite direction ejects the same, and means operative when said slide has been moved a predetermined amount to move the slide further automatically to lock said arms against the article.

17. A machine for concaving heels having in combination, a concaving cutter, means for holding a heel, and means for moving the holding means to move the heel first at a uniform rate to bring the seat of the heel in engagement with the cutter progressively along a path parallel to the edge contour of the heel seat and thereafter move the heel holding means at an increased rate to return it to its initial position through a path such as to keep the heel out of the range of the action of the cutter.

18. A machine for concaving heels having, in combination, a concaving cutter, means for holding a heel, means for actuating the holding means about the cutter from an initial position back to the initial position in a curved path during which the seat of the heel is brought into engagement with the cutter progressively along a path parallel to the edge contour of the heel seat, and a slide movable to render said holding means ineffective and to engage the heel and eject the same.

19. A machine for concaving heels having, in combination, a concaving cutter, means for holding a heel, means for actuating the holding means about the cutter from an initial position back to the initial position in a curved path during which the seat of the heel is brought into engagement with the cutter progressively along a path parallel to the edge contour of the heel seat, a slide movable to render said holding means ineffective and to engage the heel and eject the same, and means adapted to move said slide to eject the heel while the heel holding means is returning to its initial position.

WALTER C. BROOKS.
JOHN W. STAPLES.